United States Patent
Takeda et al.

(10) Patent No.: US 10,667,287 B2
(45) Date of Patent: May 26, 2020

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Tooru Uchino, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/753,417

(22) PCT Filed: Aug. 12, 2016

(86) PCT No.: PCT/JP2016/073797
§ 371 (c)(1),
(2) Date: Feb. 19, 2018

(87) PCT Pub. No.: WO2017/033779
PCT Pub. Date: Mar. 2, 2017

(65) Prior Publication Data
US 2018/0249487 A1    Aug. 30, 2018

(30) Foreign Application Priority Data
Aug. 21, 2015   (JP) ................................. 2015-164188

(51) Int. Cl.
*H04W 72/12*   (2009.01)
*H04W 72/04*   (2009.01)
(Continued)

(52) U.S. Cl.
CPC ......... *H04W 72/1268* (2013.01); *H04J 11/00* (2013.01); *H04L 5/0007* (2013.01);
(Continued)

(58) Field of Classification Search
CPC .......... H04W 72/12; H04W 72/04; H04L 5/00
See application file for complete search history.

(56) References Cited

U.S. PATENT DOCUMENTS 8,483,134 B2   7/2013  Iwai et al.
8,509,161 B2   8/2013  Imamura
(Continued)

FOREIGN PATENT DOCUMENTS

EP          2290890 A1      3/2011
JP       2011-077987 A      4/2011
(Continued)

OTHER PUBLICATIONS

International Search Report issued in PCT/JP2016/073797 dated Oct. 25, 2016 (2 pages).

(Continued)

*Primary Examiner* — Zhiren Qin
(74) *Attorney, Agent, or Firm* — Osha Liang LLP

(57) ABSTRACT

In order to perform UL transmission in a future radio communication system, a user terminal comprising: a generating section that generates an uplink (UL) signal to transmit to a radio base station; and a control section that controls transmission of the UL signal. The control section switches between OFDMA based transmission and SC-FDMA based transmission to apply to the UL signal. In addition, the user terminal controls the OFDMA based transmission and the SC-FDMA based transmission autonomously or based on information transmitted from the radio base station.

3 Claims, 11 Drawing Sheets

(51) Int. Cl.
*H04L 27/01* (2006.01)
*H04J 11/00* (2006.01)
*H04L 5/00* (2006.01)
*H04W 4/70* (2018.01)
*H04W 88/02* (2009.01)

(52) U.S. Cl.
CPC .......... *H04L 5/0044* (2013.01); *H04L 5/0048* (2013.01); *H04L 27/01* (2013.01); *H04W 72/04* (2013.01); *H04W 72/042* (2013.01); *H04W 72/12* (2013.01); *H04W 4/70* (2018.02); *H04W 88/02* (2013.01)

(56) References Cited

U.S. PATENT DOCUMENTS

| | | |
|---|---|---|
| 9,184,825 B2 | 11/2015 | Kimura |
| 2010/0034152 A1* | 2/2010 | Imamura ............... H04L 5/0007 370/329 |
| 2010/0080187 A1* | 4/2010 | Papasakellariou .... H04L 5/0051 370/329 |
| 2011/0205966 A1 | 8/2011 | Iwai et al. |
| 2013/0070703 A1* | 3/2013 | Yasukawa ............. H04L 5/0091 370/329 |
| 2014/0126556 A1* | 5/2014 | Tiirola .............. H04W 56/0005 370/336 |
| 2015/0280888 A1* | 10/2015 | Karsi .................... H04L 5/0073 370/329 |

FOREIGN PATENT DOCUMENTS

| | | | | |
|---|---|---|---|---|
| JP | 2011-530837 A | | 12/2011 | |
| JP | 2011530837 A | * | 12/2011 | ........... H04L 5/0007 |
| JP | 2012502600 A | * | 1/2012 | ........... H04L 1/0025 |
| JP | 2012114943 A | * | 6/2012 | ........... H04W 16/26 |
| JP | 2015057888 A | * | 3/2015 | ........... H04L 5/0023 |
| WO | 2009/153978 A1 | | 12/2009 | |

OTHER PUBLICATIONS

Written Opinion of the International Searching Authority issued in PCT/JP2016/073797 dated Oct. 25, 2016 (4 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Extended European Search Report issued in the counterpart European Patent Application No. 16839126.6, dated Feb. 18, 2019 (10 pages).

* cited by examiner

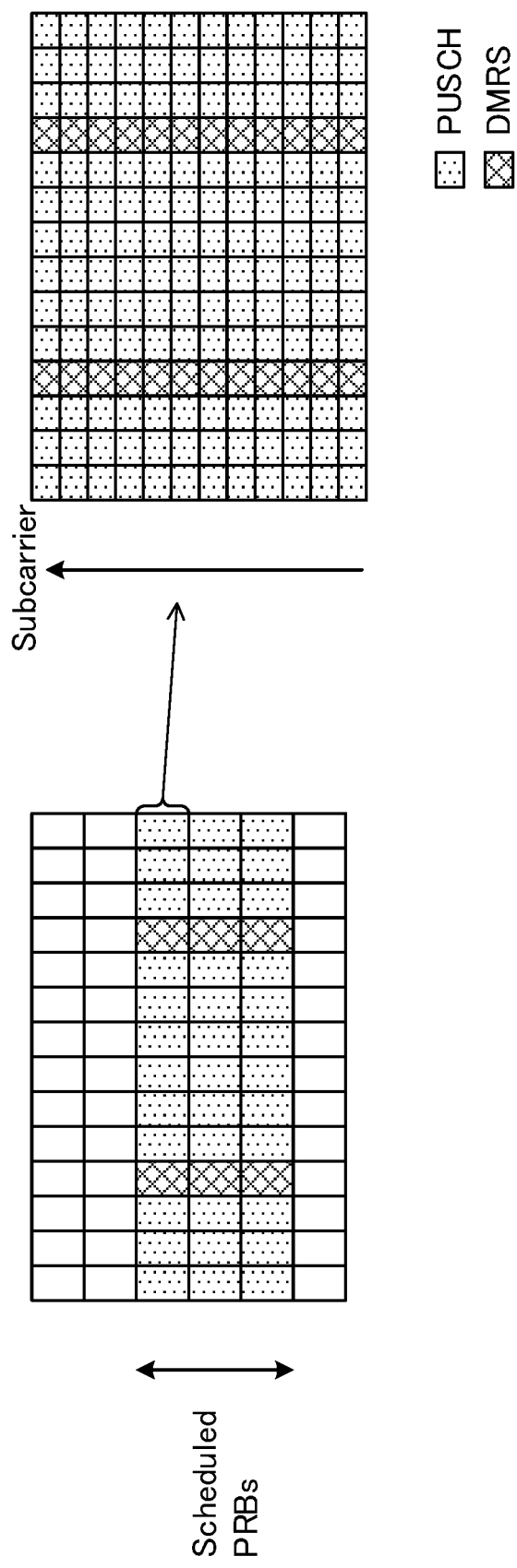

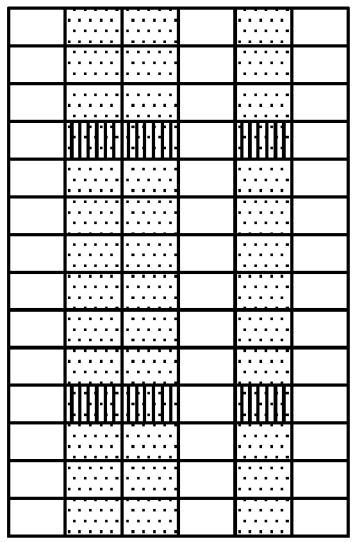
FIG. 3B OFDMA BASED
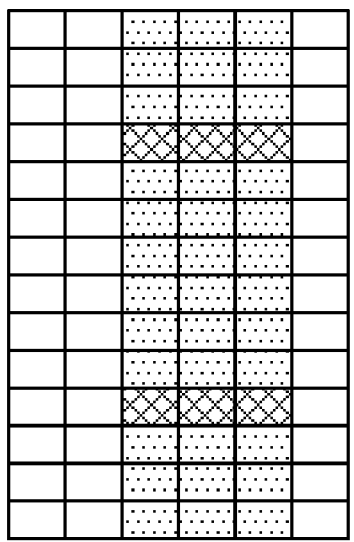
FIG. 3A SC-FDMA BASED

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In a UMTS (Universal Mobile Telecommunications System) network, for the purposes of achieving higher-speed data rates, providing low delay and so on, long-term evolution (LTE) has been standardized (see Non Patent Literature 1). For the purposes of achieving further broadbandization and higher speed beyond LTE, LTE advanced has been standardized (Rel. 10-12), and further successor systems to LTE called 5G (5th Generation Mobile Communication System), FRA (Future Radio Access) and so on have been also studied.

In future radio communication systems (e.g., 5G), due to their use for mobile broadband, it is assumed that there will be a demand for further increases in speed and volume, while being required to reduce delay and deal with the connecting of a large volume of devices. Furthermore, in order to achieve a further increase in speed and volume, it is also envisaged that an even broader bandwidth of the frequency spectrum will be utilized.

CITATION LIST

Non Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

In future radio communication systems like 5G, there is a demand for improvement of uplink frequency usage efficiency. In addition, in future radio communication systems, communication in a high frequency band of several GHz to several tens GHz (for example, about 6 GHz to 60 GHz) is expected as well, and the coverage for a user terminal needs to be ensured.

Further, in future radio communication systems, there is expected communication of a relatively small amount of data such as IoT (Internet of Things), MTC (Machine Type Communication), M2M (Machine To Machine). Thus, in future radio communication systems, various communication conditions are expected to be required in accordance with the communication environment. If in such a future radio communication system, the mechanism of an existing LTE system is still applied, there may occur a risk of difficulty in providing enough communication services.

The present invention was carried out in view of the foregoing and aims to provide a user terminal, a radio base station and a radio communication method capable of performing UL transmission appropriately in a future radio communication system.

Solution to Problem

A user terminal of an aspect of the present invention comprising: a generating section that generates an uplink (UL) signal to transmit to a radio base station; and a control section that controls transmission of the UL signal, wherein the control section switches between OFDMA (Orthogonal Frequency Division Multiple Access) based transmission and SC-FDMA (Single-Carrier Frequency Division Multiple Access) based transmission to apply to the UL signal.

Advantageous Effects of Invention

According to the present invention, it is possible to preform UL transmission appropriately in a future radio communication system.

BRIEF DESCRIPTION OF DRAWINGS

FIGS. 1A and 1B are diagrams illustrating an example of an uplink (UL) physical layer configuration in an existing LTE system (LTE Rel. 8-12);

FIG. 3A is a diagram illustrating an example of SC-FDMA base UL physical layer configuration; and FIG. 3B is a diagram illustrating an example of OFDMA base UL physical layer configuration;

DESCRIPTION OF EMBODIMENTS

FIG. 1 provides diagrams illustrating an example of the uplink (UL) physical layer configuration in the existing LTE system (LTE Rel. 8-12). As illustrated in FIG. 1, in the existing LTE system, single carrier FDMA (SC-FDMA) or DFT-spread OFDM is applied, and allocation of uplink data (PUSCH) is limited to continuous physical resource blocks (PRBs: Physical Resource Blocks) (see FIG. 1A).

Therefore, it is configured that a reference signal (for example, a demodulation reference signal (DM-RS)) and data are not frequency division multiplexed in the same SC-FDMA symbol (see FIG. 1B). In this case, overhead of a reference signal (RS) is increased (RS overhead is 14 percent in FIG. 1B), and it is difficult to increase the frequency usage efficiency sufficiently.

Then, in order to increase the uplink frequency usage efficiency, adaptation of an OFDM (also called UL-PFDM) in UL transmission is considered like in DL transmission. On the other hand, the inventors of the present invention have noted that when UL-OFDM is adopted, the Peak-to-Average-Power-Ratio (PAPR) is increased as compared with SC-FDMA, which makes it difficult to ensure the coverage.

In a future radio communication system, communication is expected to be performed in a high frequency band of several GHz to several tens GHz (for example, about 6 GHz to 60 GHz) and in view of the coverage securement, it may be preferable to apply SC-FDMA base UL transmission. In addition, in a future radio communication system, communication of a relatively small amount of data is also expected such as IoT (Internet of Things), MTC (Machine Type Communication), M2M (Machine To Machine), and it is sometimes preferable to apply SC-FDMA base UL transmission depending on the purpose of communication.

Then, the present inventors have found the idea of controlling to switch the UL transmission method (UL subframe configuration) between OFDM base or SC-FDMA DFT-precoded OFDM) base depending on a given condition.

Figure 2A:
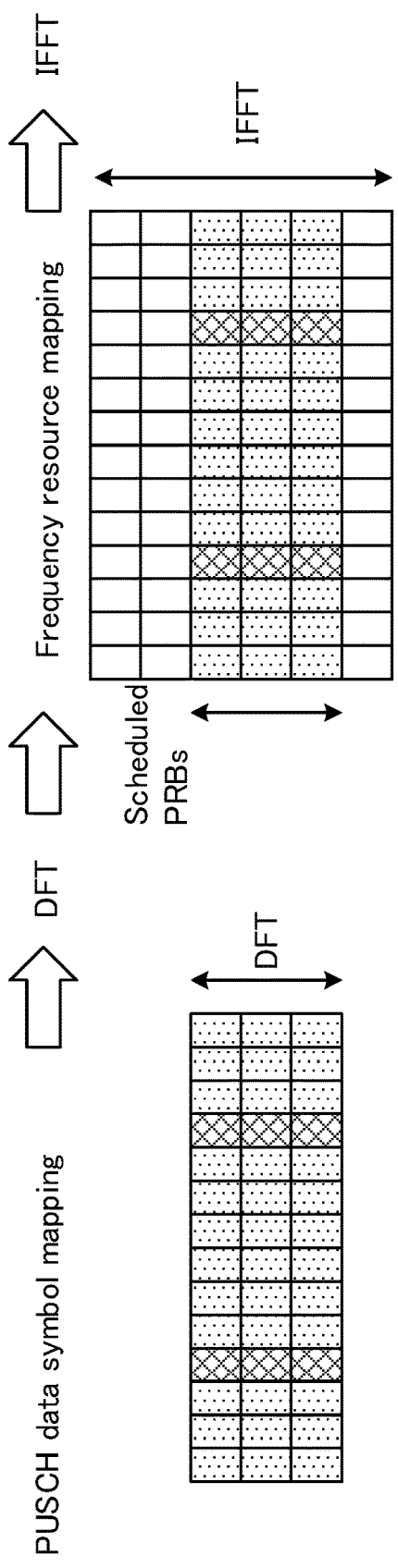
FIG. 2A is a diagram illustrating an example of an SC-FDMA base UL physical layer configuration.
Figure 2B:
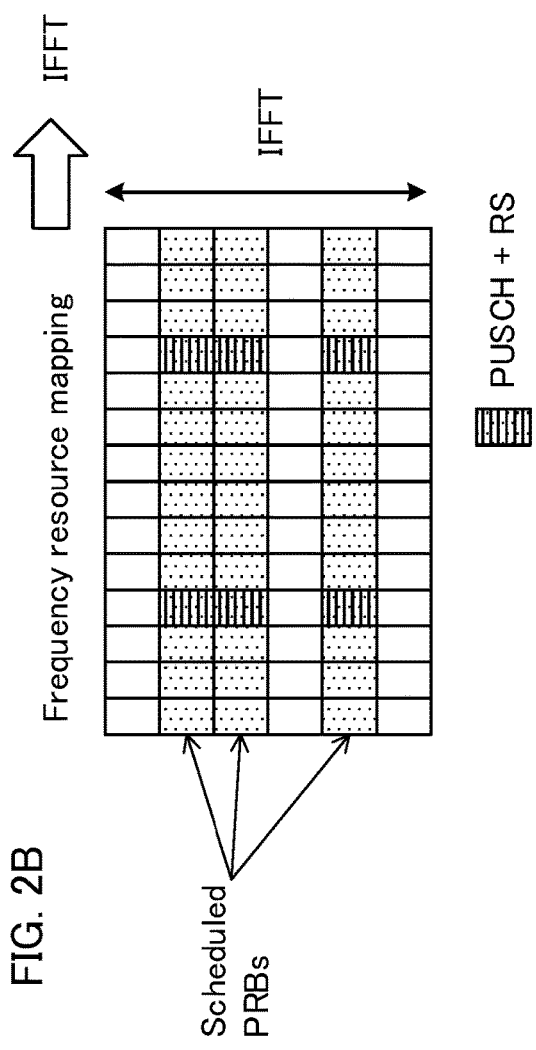
FIG. 2B is a diagram illustrating an example of an OFDMA base UL physical layer configuration.

FIG. 2 illustrates an example of the SC-FDMA base UL physical layer configuration (see FIG. 2A) and an example of the OFDM base UL physical layer configuration (see FIG. 2B).

When the user terminal performs the SC-FDMA base UL transmission (see FIG. 2A), the user terminal applies discrete Fourier transform (DFT) to a generated signal and after applying the DFT, the user terminal applies inverse fast Fourier transform (inverse FFT (IFFT)) to the resultant signal. For example, after UL data symbols (for example, PUSCH data symbol) are mapped, DFT is applied from the first symbol, and they are converted to the frequency domain. After the UL data symbols are mapped to a frequency resource, IFFT is applied to convert the symbols to the time domain and then, they are transmitted. In this way, by allocating UL data to continuous PRBs, it is possible to suppress waveform amplitude fluctuation (PAPR).

When OFDMA base UL transmission is performed (see FIG. 2B), the user terminal applies IFFT to a generated signal without application of DFT. For example, after mapping UL data symbols (for example, PUSCH data symbols) to a give frequency resource, the user terminal applies IFFT and converts them to the time domain to perform transmission. In this case, PAPR becomes high, but it is possible to map UL data to discontinuous resource blocks and map a reference signal and data (for example, PUSCH) by frequency division multiplexing them. For example, the reference signal (RS) and data (for example, PUSCH) may be mapped to separate subcarriers in the same OFDM symbol and subjected to frequency division multiplexing or may be mapped to separate PRBs and subjected to frequency division multiplexing.

Thus, in the present embodiment, the user terminal controls to switch SC-FDMA base UL transmission (see FIG. 2A) and OFDMA base UL transmission (see FIG. 2B) depending on a given condition. For example, the user terminal is able to select either of SC-FDMA base UL transmission and ODFMA base UL transmission in accordance with an instruction from the radio base station or autonomous control based on transmission power or the like.

The next description is made of embodiments in detail below. The following description concerns UL transmission in consideration of the LTE/LTE-A system, however, this is not intended to limit the present invention. The embodiments may be applied to any system as far as the system employs different communication schemes (for example, SC-FDMA base and UL-OFDMA base) in UL transmission.

First Embodiment

In the first embodiment, it is assumed that the user terminal controls the UL transmission scheme to apply to UL transmission (also called UL physical layer configuration, UL subframe configuration) on the basis of an instruction from the radio base station.

<First Mode>

In a first mode, the user terminal selects SC-FDMA base UL transmission or OFDMA base UL transmission based on information given from the radio base station by higher layer signaling (for example, RRC signaling, broadcast information or the like).

For example, the radio base station is able to give information about a UL transmission scheme as well as the transmission mode TM) to provide (configure) the user terminal by higher layer signaling. The user terminal controls UL transmission based on the information about the UL transmission scheme (SC-FDMA bae UL transmission or OFDMA base UL transmission) provided by higher layer signaling.

When the user terminal is connected to a plurality of cells (or component carriers) or radio base stations by applying carrier aggregation (CA) or dual connectivity (DC), the UL transmission scheme may be controlled on a per cell basis or on a per radio base station to connect basis. For example, when the user terminal is configured with a plurality of cells, it may be configured that SC-FDMA base UL transmission is always performed for a specific cell (for example, PCell) and either SC-FDMA base UL transmission or OFDMA base UL transmission is performed for other cells (for example, SCell).

Or, switch between SC-DMA base UL transmission and OFDMA base UL transmission may be controlled per transmission time interval (TTI) or per slot. In this case, the user terminal is given information about a time to switch the UL transmission scheme (for example, information about a subframe) by higher layer signaling or the like. Here, the transmission time interval is also called transmission time interval and TTI in the LTE system (Rel. 8-12) is called subframe length.

In addition, the radio base station is able to change the content of downlink control information (DCI format) to transmit to the user terminal based on the UL transmission scheme to provide to the user terminal. For example, information indicating a PRB allocation portion to provide to the user terminal is changed depending on the UL transmission scheme.

When the radio base station signals the PDFDMA base UL transmission to the user terminal, the UL data (for example, PUSCH) is able to be allocated to discontinuous PRBs. In this case, the radio base station is able to provide the user terminal with downlink control information including a bit map field of allocation PRBs to which the UL data is allocated (or PRB group). Thus, as the allocation PRBs are signaled to the user terminal based on the bit map field, even when the UL data is allocated to discontinuous PRBs, the user terminal is able to recognize the allocation position of the UL data appropriately.

In the case where the radio base station signals SC-FDMA base UL transmission to the user terminal, allocation of UL data (for example, PUSCH) is limited to continuous PRBs. In this case, the radio base station may provide the user terminal with downlink control information including information about the smallest PRB number of PRBs to allocate UL data and the number of PRBs to allocate. Thus, by configuring the user terminal to change the content about the UL data allocation based on the UL transmission scheme, it is possible to suppress increase of overhead of the downlink control information.

In addition, when UL-MIMO and/or UL-CA is applied, it is also possible to control PRB scheduling results (PRB allocation) independently per layer and/or CC.

The user terminal controls the processing of a UL signal based on the UL transmission scheme provided from the radio base station. For example, when receiving an instruction of the SC-FDMA base UL transmission, the user terminal performs DFT processing (DFT-precoding) on UL signals (see FIG. 3A). In addition, when receiving an instruction of SC-FDMA base UL transmission, the user terminal is able to use a CAZAC sequence as a reference signal (for example, a demodulation reference signal) in generation.

On the other hand, when receiving an instruction of the OFDMA base UL transmission, the user terminal generates a UL signal without performing the DFT processing (see FIG. 3B). In addition, when receiving an instruction of the OFDMA base UL transmission, the user terminal may use, as a reference signal (for example, a demodulation reference signal), a frequency-domain PSK (Phase Shift Keying) signal not a CAZAC sequence.

Further, the user terminal is also able to change mapping of data (for example, PUSCH) and a reference signal based on the UL transmission scheme received from the radio base station. For example, when receiving an instruction of the OFDMA base UL transmission, the user terminal may not map the reference signal (for example, demodulation reference signal) all over the frequency (subcarriers) in a given symbol in a PRB, but map the reference signal to a given location (given subcarrier). In this case, as data (for example, PUSCH) is mapped to a region where the reference signal is not mapped, it is possible to increase the frequency usage efficiency.

When receiving an instruction of the SC-FDCA base UL transmission, the user terminal preferably maps the reference signal over one symbol in the same band as a transmission signal, since a CAZAC sequence is used as the reference signal.

In addition, when transmitting uplink control information (UCI) with use of PUSCH (transmitting uplink data and an uplink control signal at the same time), the user terminal is able to change mapping of the uplink control information based on the UL transmission scheme received from the radio base station.

Figure 4B:
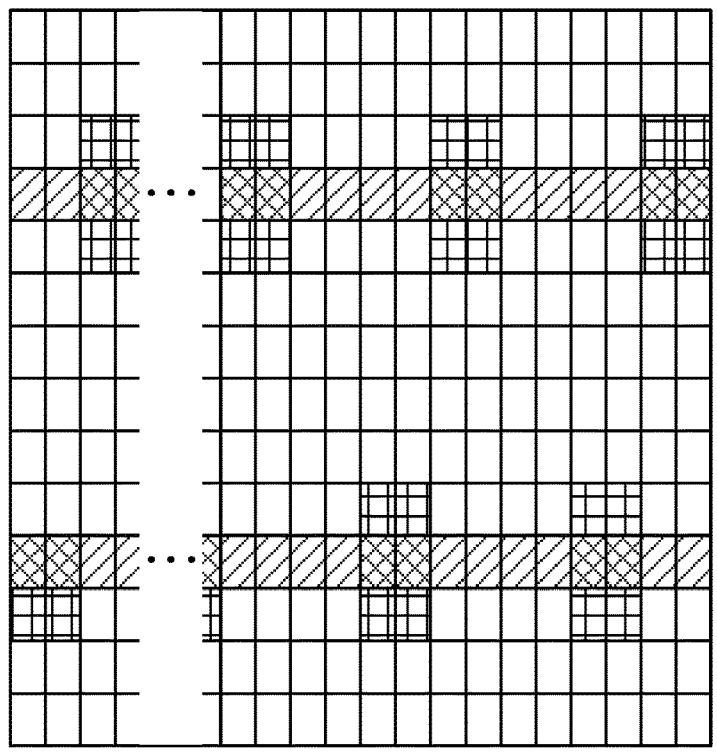
FIGS. 4A and 4B are diagrams illustrating an example of allocation of uplink control information to PUSCH according to an embodiment.
Figure 4A:
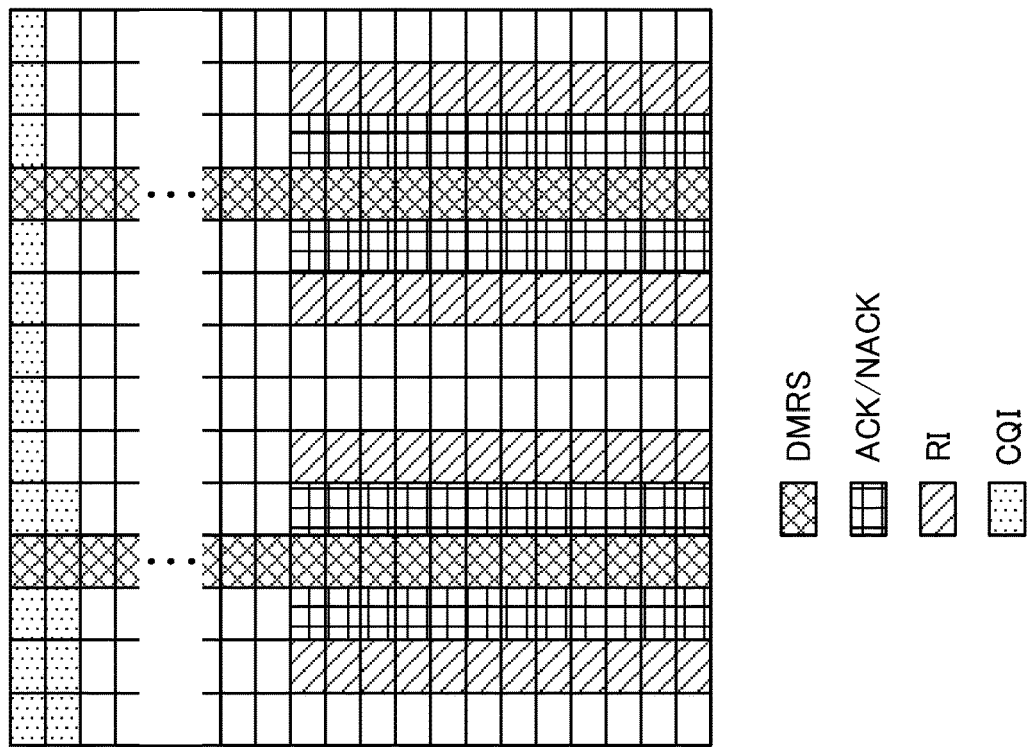

When receiving an instruction of the SC-FDMA base UL transmission, the user terminal is able to allocate an uplink control information (for example, a transmission acknowledgement signal (ACK/NACK), rank indicator (RI) and the like) to an adjacent symbol to the reference signal (see FIG. 4A). Note that FIG. 4A illustrates a signal sequence before DFT-precoding. Thus, as the uplink control information is mapped to a region near the reference signal, it is possible to perform demodulation based on high channel estimation accuracy thereby to increase UL transmission quality.

When receiving an instruction of the OFDMA base UL transmission, as explained above, the user terminal is able to map the reference signal to a given location without mapping the reference signal over the frequency (subcarriers) in a given symbol. Therefore, the user terminal is able to map the uplink control information not only to neighbor symbols to the reference signals but also to the subcarriers between reference signals (see FIG. 4B). In other words, the user terminal is able to perform frequency division multiplex a reference signal and uplink control information. As one example, as illustrated in FIG. 4B, rank indicator (RI) may be mapped to between reference signals and a transmission acknowledgement signal (ACK/NACK) may be mapped to an adjacent symbol to the reference signal. Thus, as the uplink control information is mapped in the frequency direction, it is possible to achieve frequency diversity effect. Note that arrangement of the uplink control information is not limited to that shown in FIG. 4B.

Here, when a transmission acknowledgement signal (ACK/NACK) and a rank indicator (RI) are arranged to an adjacent subcarrier to a subcarrier where the reference signal is mapped as mentioned above or an adjacent symbol, the user terminal is able to perform rate matching or puncture of data to be arranged in a subcarrier where the UCI is mapped.

Further, when transmitting uplink control information (UCI) and uplink data (PUSCH) simultaneously (for example, simultaneous transmission of PUCCH and PUSCH), the user terminal is able to control mapping based on the UL transmission scheme provided from the radio base station.

When receiving an instruction of the OFDMA base UL transmission, the user terminal is able to transmit the uplink control channel in a resource other than a resource for the uplink shared channel. The other resource may be PRBs or OFDMA symbols. For example, the uplink data PUSCH) may be allocated to different PRBs and the uplink control information may be allocated to the uplink control channel (PUCCH) provided at the end of the system bandwidth (see FIG. 5A). In this case, the uplink data (for example, PUSCH) and the uplink control information (for example, PUCCH) are frequency division multiplexed (FDM).

Figure 5B:
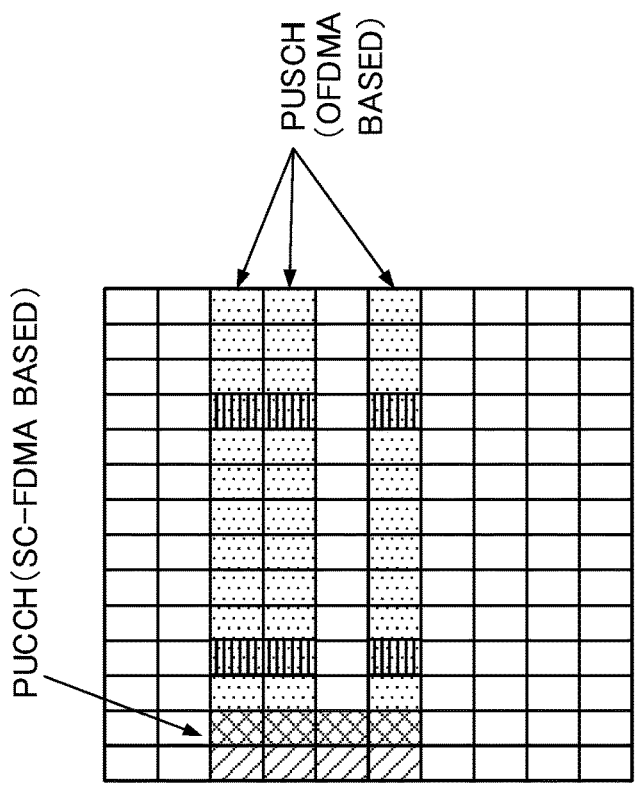
FIGS. 5A and 5B are diagrams illustrating an example of the UL physical layer configuration according to the present embodiment.
Figure 5A:
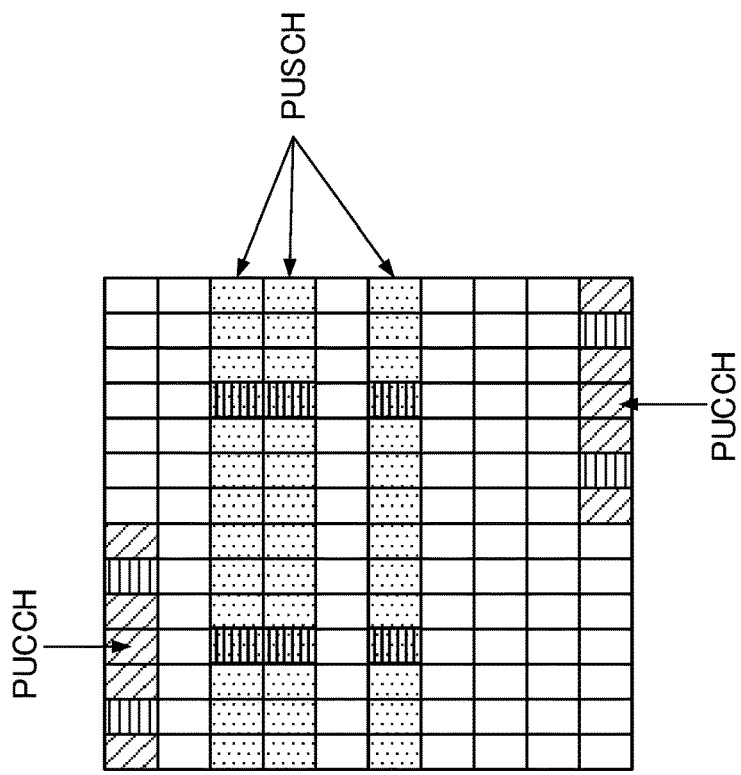

Otherwise, the user terminal may transmit a channel (for example, PUCCH) to transmit the uplink control information in the SC-FDMA base UL transmission and transmit a channel (for example, PUSCH) to transmit uplink data (UL-SCH) in the OFDMA base UL transmission (see FIG. 5B). In FIG. 5B, the uplink data (for example, PUSCH) and the uplink control information (for example, PUCCH) are time division multiplexed (TDM). In this case, the radio base station is able to provide the UL transmission scheme to apply to the uplink control information and the UL transmission scheme to apply to the uplink data respectively. Otherwise, is may be configured that the UL transmission scheme to apply to one of the uplink control information and the uplink data is defined in advance and the UL transmission scheme to apply to the other of the uplink control information and the uplink data is signaled to the user terminal.

In addition, the user terminal is able to control UL transmission power control based on the UL transmission scheme provided from the radio base station.

The user terminal is able to determine transmission power of a UL signal by using the same transmission power expression in the OFDMA base UL transmission and the SC-FDMA base UL transmission. The transmission power expression as used may be the following expression (1). Needless to say, applicable transmission power expressions may not be limited to this.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$ [Expression 1]

In addition, when performing the OFDMA base UL transmission, the user terminal may add backoff to $P_{CMAX,c}$ of the expression (1) in consideration of an increase in PRPR. That is, when performing the OFDMA base UL transmission, -X [dB] may be added to the term $P_{CMAX,c}$. The value X may be provided from the radio base station to the user terminal by higher layer signaling or the like, or the user terminal may set the value X autonomously. Here, the backoff denotes a difference between saturated power and actual output power.

Further, the user terminal may perform calculation of PHR (Power Headroom Report) in consideration of the backoff. The PHR denotes the report operation that the user terminal feeds residual transmission power of the user terminal back to the radio base station. The PHR includes a PH that is difference value between the transmission power $P_{PUSCH}$ of the user terminal and the maximum transmission power $P_{CMAX}$.

For example, when performing the OFDMA base UL transmission, the user terminal is able to calculate residual power from $P_{CMAX,c}$-X[dB] as PHR. In this case, the user terminal may report a value of $P_{CMAX,c}$-X [dB] in addition to the PHR value to the radio base station. With this process, the base station is able to identify the value of $P_{CMAX,c}$ that is a value determined by the user terminal autonomously and recognize the residual power of the user terminal accurately.

<Second Mode>

In the second mode, it is assumed that the user terminal selects the SC-FDMA base UL transmission or the OFDMA base UL transmission dynamically based on information given from the radio base station by physical layer signaling (for example, downlink control information).

The radio base station is able to provide the UL transmission scheme (the OFDMA base UL transmission or the SC-FDMA base UL transmission) to the user terminal based on at least either of the following (1) to (7).

(1) Multiple (e.g., Two) L1/L2 Control Signals of Different Payloads

The user terminal is able to select the UL transmission scheme based on the payload size of a detected L1/L2 control signal (for example, PDCCH). In this case, L1/L2 control signals of different payloads are defined in advance as associated with respective given UL transmission schemes (the OFDMA base UL transmission or SC-FDMA base UL transmission).

For example, the user terminal tries to perform blind decoding of each of DCI formats having two payloads in a downlink control channel. The user terminal determines whether UL scheduling of a subframe is OFDMA base or SC-FDMA base in accordance with the payload of the DCI format that shows a CRC decision is OK, and based on its determination result, the user terminal generates an uplink data signal. When the subframe needs to be used to transmit uplink control information such as a transmission acknowledge signal (ACK/NACK), rank indicator (RI), channel quality measurement information (CQI: channel quality indicator), etc., in the OFDMA base UL transmission, the uplink control information and data are frequency division multiplexed and in the SC-FDMA base UL transmission, the subcarriers of the data are subjected to rate matching or puncturing so that the uplink control information may be mapped.

(2) Sequence in which CRS of a Detected L1/L2 Control Signal is Masked

The user terminal is able to select the UL transmission scheme based on the size of a detected L1/L2 control signal. For example, the user terminal tries blind decoding of a DCI format in the downlink control channel and uses its decoding result as a basis to determine decoding OK or NG by a CRC masked by two different sequences. The user terminal determines whether the UL scheduling of the subframe is the OFDMA base or the SC-FDMA base in accordance with a CRC masking sequence of a DCI format of the CRC determined to be OK, and based on its determination result, the user terminal generates an uplink signal. Used as a CRC masking sequence may be, for example, RNTI (Radio Network Temporary Identifier). For example, it may be configured that if masking is performed with C-RNTI given from the base station at the RRC connection, the SC-FDMA based transmission is performed and if masking is performed with another RNTI (for example, UL-RNTI) provided additionally, the OFDMA based transmission is performed.

(3) Specific Bit Field Value Included in Detected L1/L2 Control Signal

The user terminal is able to select the UL transmission scheme based on a specific bit field value of a detected L1/L2 control signal (for example, PDCCH). The specific bit field may be a bit field newly added to the user terminal configured to switch the UL transmission scheme, or the bit field included in the existing DCI format may be reused. If the additional bit field is used, it is possible to indicate which UL transmission scheme to use by one bit. The additional bit field is only added to a DCI format detected by the UE-specific search space, and it may be configured that the user terminal performs the SC-FDMA base UL transmission if a control signal to schedule UL data is detected in the common search space. If the existing bit field is reused, for example, there is adopted a method of using one of three bits for designating a cyclic shift number of a reference signal. In this case, if a control signal for scheduling UL data is detected in the common search space, the user terminal may transmit an SCOFDMA base signal irrespective of a value in the bit field.

(4) Whether Allocated PRBs are Continuous or not

The user terminal may select the UL transmission scheme in accordance with whether PRBs to which UL data is allocated are continuous or not. For example, it may be configured that when allocated PRBs are continuous, the user terminal performs the SC-FDMA base UL transmission and if allocated PRBs are not continuous, the user terminal performs the OFDMA base UL transmission.

(5) MCS (Modulation and Coding Scheme) Level

The user terminal is able to select the UL transmission scheme in accordance with the MCS level. For example, it may be configured that when the MCS level is lower than a predetermined value, the user terminal performs the SC-FDMA base UL transmission and when the MCS level is higher than the given value, the user terminal performs the OFDMA base UL transmission. With this configuration, when the MCS level is low (communication quality is poor), the SC-FDMA based transmission is performed to increase the coverage preferentially, and when the MCS level is high (communication quality is high), the OFDMA base UL transmission is performed thereby to improve the frequency usage efficiency preferentially.

(6) Whether Uplink Control Information (UCI) is Present or not

The user terminal is able to select the UL transmission scheme in accordance with whether uplink control information such as a transmission acknowledgement signal (HARQ-ACK) or the like is present or not. For example, it may be configured that when transmitting uplink control information in a subframe to transmit an uplink data, the user terminal performs the SC-FDMA base UL transmission, and when not transmitting the uplink control information, the user terminal performs the OFDMA base UL transmission. Note that at this time, the user terminal may perform rate matching or puncture data symbols of scheduled uplink data thereby to map the uplink control information.

(7) Whether UL-MIMO and/or UL-CA Applies or not

The user terminal is able to select the UL transmission scheme in accordance with whether the UL-MIMO and/or UL-CA applies or not. For example, if the UL-MIMO and/or UL-CA applies, in order to increase the application area (coverage), the SC-FDMA based transmission is performed because the PAPR is small and the power efficiency is good. When the UL-MIMO and/or UL-CA does not apply, the OFDMA based transmission is performed because the frequency usage efficiency is high in order to increase the data rate. On the other hand, when the UL-MIMO and/or UL-CA applies, the OFDMA based transmission is performed to increase the frequency usage efficiency on the assumption that there is residual transmission power (not power limited). When the UL-MIMO and/or UL-CA does not apply, power limited is expected and therefore, the SC-FDMA based transmission may be performed because of small PAPR and good power efficiency.

Here, when the radio base station informs the user terminal of the UL transmission scheme by higher layer signaling, the radio base station may provide the user terminal with information about a period (for example, subframe) where the UL transmission scheme is switchable by higher layer signaling.

When the user terminal calculates and reports a virtual PHR (VPH: Virtual PH) of a given cell (CC), the user terminal is able to calculate the virtual PHR assuming the SC-FDMA based transmission. The virtual PHR corresponds to a PH that does not depend on the PUSCH bandwidth and it is a PHR that is determined without depending on actual uplink resource allocation when it is assumed that there is specific PUSCH (and/or PUCCH) transmission. The virtual PHR is applicable, for example, when dual connectivity is applied.

When calculating and reporting the virtual PHR on the assumption of the SC-FDMA based transmission, the user terminal is able to calculate virtual PHR without considering power backoff (calculate the virtual PHR without power backoff). In this case, as the power backoff is not included in the virtual PHR, the radio base station is able to estimate accurate path loss (PL).

Otherwise, when calculating and reporting virtual PHR of a given cell (CC), the user terminal is able to calculate the virtual PHR on the assumption of the OFDMA based transmission. At this time, the user terminal is able to calculate virtual PHR without considering power backoff (calculate the virtual PHR without power backoff). With this configuration, the radio base station is able to recognize residual power of the user terminal appropriately.

Modified Example

When the UL data is allocated to continuous PRBs, it may be configured that a given signal or a given symbol is always transmitted on the SC-FDMA base, irrespective of whether the UL transmission scheme is the OFDMA based transmission or the SC-FDMA based transmission.

Figure 6:
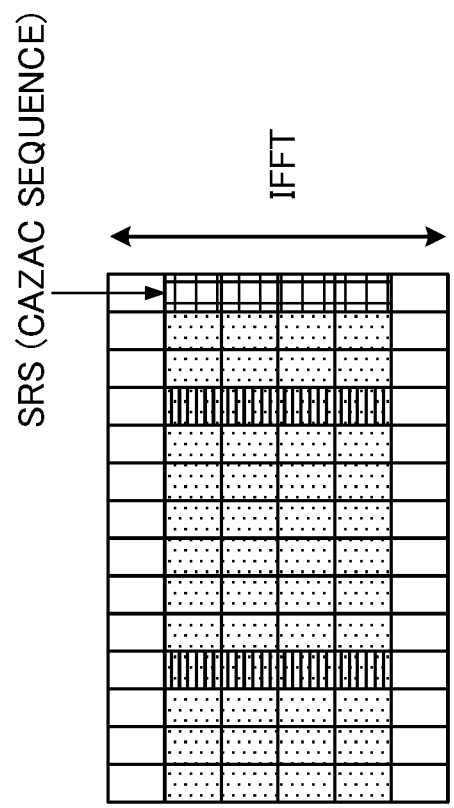
FIG. 6 is a diagram illustrating another example of the UL physical layer configuration according to the present embodiment.

For example, it is assumed that UL data (for example, PUSCH) and a reference signal (for example, a sounding reference signal/a sounding reference symbol (SRS)) are allocated to continuous PRBs as illustrated in FIG. 6. In this case, even when the OFDMA based transmission is applied to the UL data, the SC-FDMA based transmission is able to be applied to the SRS. With this configuration, the SRS is able to be transmitted with application of a CAZAC sequence of fixed amplitude.

Thus, by applying the SC-FDMA based transmission, it is possible to reduce PAPR and make the SRS symbol's interfering with another cell constant. In addition, as distortion of the transmission amplifier of the SRS waveform, it is possible to increase the channel state (CSI) measurement accuracy by the SRS over the entire system.

Irrespective of the UL transmission scheme, a given signal or a given symbol to apply the SC-FDMA based transmission is not limited to SRS. The SC-FDMA based transmission is also applicable to PUCCH, DMRS and so on.

Second Embodiment

In the second embodiment, it is assumed that the user terminal controls the UL transmission scheme (between the OFDMA base UL transmission or the SC-FDMA base UL transmission) to apply to the UL transmission autonomously based on given information/given condition.

<UL Transmission Power>

The user terminal is able to control the UL transmission scheme (the OFDMA base UL transmission or the SC-FDMA base UL transmission) based on transmission power. For example, when the UL transmission power is equal to or less than a given value, the user terminal is able to apply the OFDMA based transmission even when the UL data is allocated to continuous PRBs.

When the UL transmission power exceeds a given value, the user terminal is able to apply the SC-FDMA based transmission if the UL data is allocated to continuous PRBs. On the other hand, even when the UL transmission power exceeds a given value, if the UL data is instructed to be allocated to discontinuous PRBs, the user terminal is able to perform the SC-FDMA based transmission by using specific PRBs that are continuous among allocation PRBs autonomously. Otherwise, the user terminal may control not to perform the UL data transmission (to drop the transmission).

Thus, when the user terminal controls the UL transmission scheme based on the transmission power, if there is residual power, good communication quality and/or interfering, the OFDMA base UL transmission is used to increase the frequency usage efficiency. On the other hand, in other cases (for example, when high power is set), the SC-FDMA base UL transmission is used to enable operation with higher power efficiency.

<Data Type to Transmit>

The user terminal is able to switch the UL transmission scheme (the OFDMA base UL transmission or the SC-FDMA base UL transmission) based on the data type to transmit.

For example, the user terminal is able to apply the SC-FDMA base UL transmission for a given signal (for example, an uplink control signal), a given bearer (for example, an SRB: Signaling Radio Bearer) and a given packet data unit (for example, PDCP/RLC control PDU).

In addition, the user terminal may provide the radio base station with information about the UL transmission scheme that the user terminal wishes to apply. For example the user terminal is able to inform the radio base station which the user terminal wishes to do between the SC-FDMA based transmission and the OFDMA based transmission by using at least either of scheduling request (SR) signal resource, type and format.

The user terminal is able to always apply the SC-FDMA based transmission to every UL transmission that occurs during the random access procedure. For example, the user terminal applies the SC-FDMA base UL transmission to the random access preamble (PRACH) and generates a CAZAC sequence signal to transmit. In addition, as for transmission after message 3 (Msg 3) in the random access procedure, the user terminal is able to apply the OFDMA base UL transmission.

Modified Example

In a communication environment/communication system in which the user terminal determines transmission autonomously, it is configured that the SC-FDMA based transmission always applies. For example, when D2D (Device to Device) is applied in which the user terminals directly communicate with each other without intervention of a radio base station, the user terminal is able to always apply the SC-FDMA based transmission. By applying the SC-FDMA based transmission, it is possible to reduce interference between the user terminals and to allow appropriate reception of the user terminal at the reception side.

When the user terminal applies UL-CA (or DC), there occurs a situation where UL transmission power for a plurality of CCs exceeds the maximum permissible power (power limited). In the existing LTE system, if there occurs power limited, the user terminal performs power scaling and/or dropping based on a given condition. There may be a rink of occurrence of power limited also where the SC-FDMA base UL transmission and the OFDMA base UL transmission are applied to different CCs.

In the present embodiment, when UL-CA (or DC) applies, the SC-FDMA based transmission in a CC coincides with the OFDMA based transmission in another CC, and if it goes to the power limited state, either (for example, SC-FDMA transmission) is prioritized to control the transmission power (power scaling and/or drop). For example, the SC-FDMA transmission is prioritized, the user terminal is able to drop and/or perform power scaling on the OFDMA based transmission.

Generally, if the user terminal goes to the power limited state, the user terminal is highly possibly located at the edge of the coverage. Accordingly, the SC-FDMA based transmission that is important (advantageous) for the coverage securement is prioritized thereby to be able to reduce the possibility of interruption of connection (disconnection) of the user terminal. Note that it may be also possible to prioritize UL transmission of a given cell (for example, primary cell), irrespective of the UL transmission scheme, Further, the user terminal may be configured to transmit, to the radio base station, UE capability information signaling (Capability) indicating whether the OFDMA base UL transmission is allowed or not. With this structure, the radio base station is able to control communication by discriminating the user terminal from a user terminal (legacy terminal) that is not able to the OFDMA base UL transmission.

(Radio Communication System)

The following description concerns the configuration of a radio communication system according to an embodiment of the present invention. This radio communication system is applied with each of the aspects explained above. Furthermore, the communication methods of the respective aspects each can be applied independently, or in combination.

Figure 7:
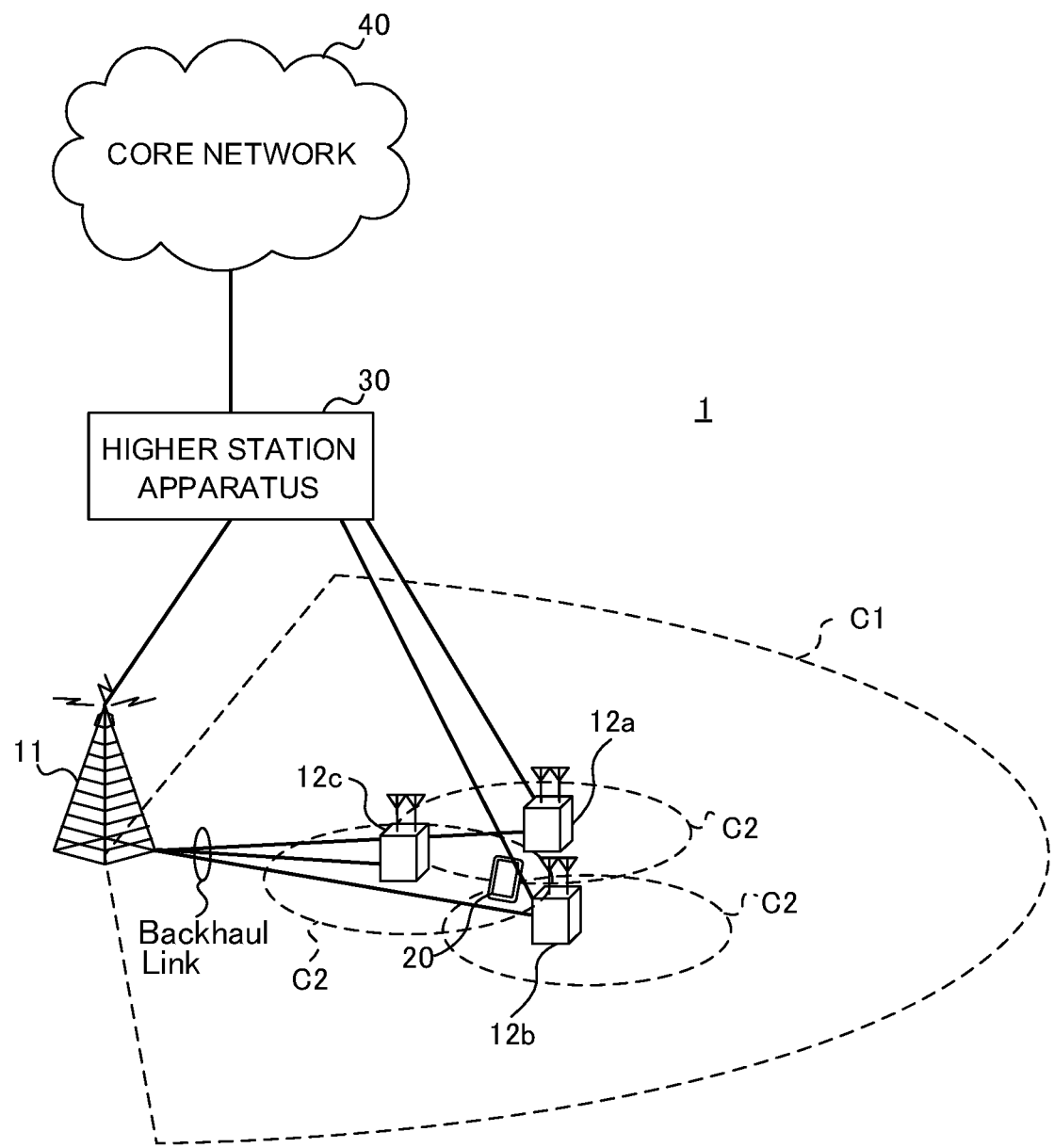
FIG. 7 is a diagram schematically illustrating an example of the configuration of a radio communication system according to a present embodiment.

FIG. 7 shows an example of a schematic configuration of the radio communication system according to an embodiment of the present invention. The radio communication system 1 can adopt carrier aggregation (CA) and/or dual connectivity (DC) in which a plurality of fundamental frequency blocks (component carriers) are aggregated and a system bandwidth of the LTE system (for example, 20 MHz) is used as one unit. Note that this radio communication system 1 may also be called SUPER 3G, LTE-A (LTE-Advanced), IMT-Advanced, 4G, 5G, or FRA (Future Radio Access), etc.

In the radio communication system illustrated in FIG. 7, there are a radio base station 11 which forms a macro cell C1, and radio base stations 12a through 12c provided within the macro cell C1 and each forming a small cell C2 that is smaller than the macro cell C1. Furthermore, a user terminal 20 is provided within the macro cell C1 and each small cell C2.

The user terminal 20 can connect both to the radio base station 11 and the radio base station 12. It is assumed that the user terminal 20 concurrently uses the macro cell C1 and the small cell C2 that use different frequencies via CA or DC. Furthermore, the user terminal 20 can apply CA or DC using a plurality of cells (CCs) (e.g., six or more CCs). Further, UL transmission and/or DL transmission between the user terminal 20 and the radio base station 11/radio base station 12 may use the short TTI.

Communication between the user terminal 20 and the radio base station 11 can be carried out using a carrier (called an "existing carrier", "Legacy carrier", etc.) having a narrow bandwidth in a relatively low frequency band (e.g., 2 GHz). Whereas, communication between the user terminal 20 and the radio base station 12 may be carried out using a carrier having a wide bandwidth in a relative high frequency band (e.g., 3.5 GHz, 5 GHz, etc.), or using the same carrier as that with the radio base station 11. Note that the configuration of the frequency used by the radio base stations is not limited to the above.

A fixed-line connection (e.g., optical fiber, or X2 interface, etc., compliant with CPRI (Common Public Radio Interface)) or a wireless connection can be configured between the radio base station 11 and the radio base station 12 (or between two radio base stations 12).

The radio base station 11 and each radio base station 12 are connected to a higher station apparatus 30, and are connected to the core network 40 via the higher station apparatus 30. The higher station apparatus 30 includes, but is not limited to, an access gateway apparatus, a radio network controller (RNC), and a mobility management entity (MME), etc. Furthermore, each radio base station 12 may be connected to the higher station apparatus 30 via the radio base station 11.

Note that the radio base station 11 is a radio base station having a relatively wide coverage, and may be called a macro base station, an aggregation node, eNB (eNodeB), a transmission/reception point or the like. Furthermore, the radio base station 12 is a radio base station having a local coverage, and may be called a small base station, a micro base station, a pico base station, a femto base station, HeNB (Home eNodeB), RRH (Remote Radio Head), a transmission/reception point, or the like. Hereinafter, the radio base stations 11 and 12 will be generally referred to as "a radio base station 10" in the case where they are not distinguished from each other.

Each user terminal 20 is compatible with each kind of communication schemes such as LTE, LTE-A, etc., and also includes a fixed communication terminal in addition to a mobile communication terminal.

In the radio communication system 1, as radio access schemes, OFDMA (Orthogonal Frequency Division Multiple Access) is applied to the downlink, and OFDMA and/or SC-FDMA (Single-Carrier Frequency Division Multiple Access) is applied to the uplink. OFDMA is a multi-carrier transmission scheme for performing communication by dividing a frequency band into a plurality of narrow frequency bands (subcarriers) and mapping data to each subcarrier. SC-FDMA is a single carrier transmission scheme to reduce interference between terminals by dividing, per terminal, the system bandwidth into bands formed with one or continuous resource blocks, and allowing a plurality of terminals to use mutually different bands.

In the radio communication system 1, used as downlink channels are a downlink shared channel (PDSCH: Physical Downlink Shared Channel) that is shared by each user terminal 20, a broadcast channel (PBCH: Physical Broadcast channel), and a downlink L1/L2 control channel, etc. PDSCH is used to transmit user data and higher layer control information, and an SIB (System Information Block). Furthermore, PBCH is used to an MIB (Master Information Block), etc.

The downlink L1/L2 control channel includes a downlink control channel (PDCCH (Physical Downlink Control Channel), an EPDCCH (Enhanced Physical Downlink Control Channel)), a PCFICH (Physical Control Format Indicator Channel), and a PHICH (Physical Hybrid-ARQ Indicator Channel), etc. PDCCH is used to transmit downlink control information (DCI), etc., which includes PDSCH and PUSCH scheduling information. PCFICH is used to transmit the number of OFDM symbols used in the PDCCH. PHICH is used to transmit a HARQ transmission acknowledgement signal (ACK/NACK) for the PUSCH. An EPDCCH that is frequency-division-multiplexed with a PDSCH (downlink shared data channel) can be used for transmitting the DCI in the same manner as the PDCCH.

In the radio communication system 1, used as uplink channels are an uplink shared channel (PUSCH: Physical Uplink Shared Channel) that is shared by each user terminal 20, an uplink control channel (PUCCH: Physical Uplink Control Channel), and a random access channel (PRACH: Physical Random Access Channel), etc. The PUSCH is used to transmit user data and higher layer control information. Uplink control information (UCI) including at least one of transmission acknowledgement information (HARQ-ACK) and radio quality information (CQI), etc., is transmitted via the PUSCH or the PUCCH. The PRACH is used to transmit a random access preamble for establishing a connection with a cell.

<Radio Base Station>

Figure 8:
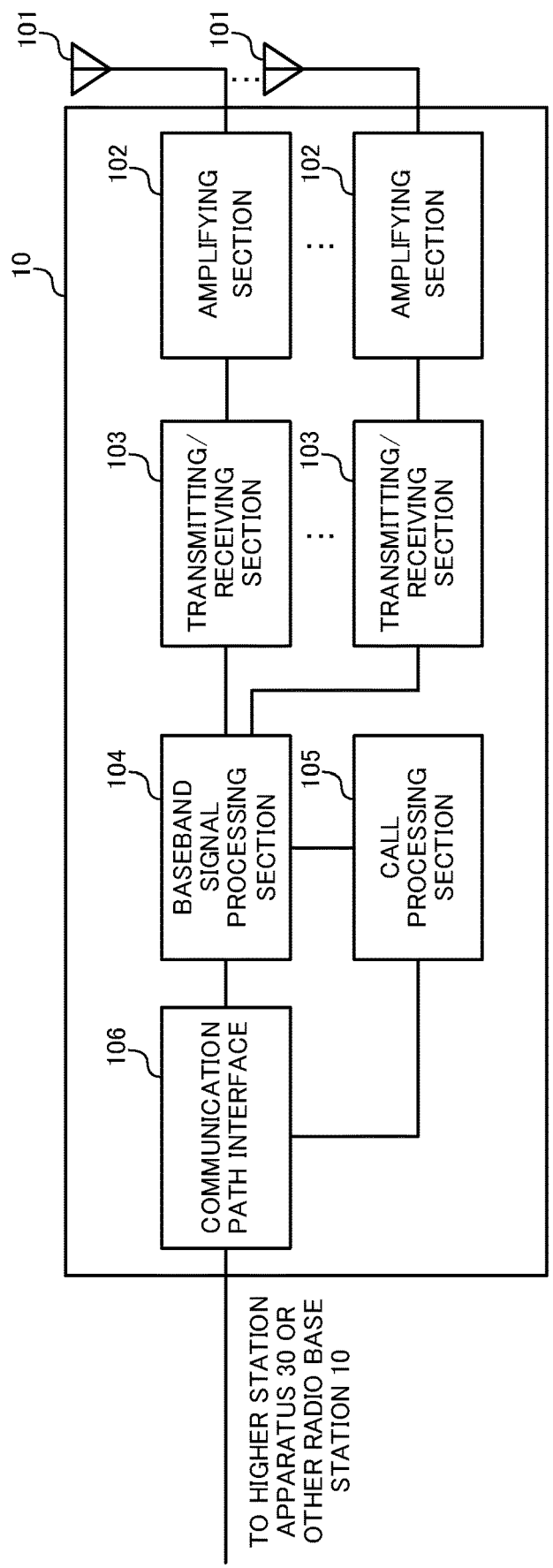
FIG. 8 is a diagram illustrating an example of the overall configuration of a radio base station according to the present embodiment.

FIG. 8 is a diagram illustrating an overall configuration of the radio base station according to the embodiment of the present invention. The radio base station 10 is configured to include a plurality of transmission/reception antennas 101, amplifying sections 102, transmission/reception sections 103, a baseband signal processing section 104, a call processing section 105 and a transmission path interface 106. Note that the transmission/reception sections 103 may be each configured of a transmission section and a reception section.

User data that is to be transmitted on the downlink from the radio base station 10 to the user terminal 20 is input from the higher station apparatus 30, via the transmission path interface 106, into the baseband signal processing section 104.

In the baseband signal processing section 104, in regard to the user data, signals are subjected to PDCP (Packet Data Convergence Protocol) layer processing, RLC (Radio Link Control) layer transmission processing such as division and coupling of user data and RLC retransmission control transmission processing, MAC (Medium Access Control) retransmission control (e.g., HARQ (Hybrid Automatic Repeat reQuest) transmission processing), scheduling, transport format selection, channel coding, inverse fast Fourier transform (IFFT) processing, and precoding processing, and resultant signals are transferred to the transmission/reception sections 103. Furthermore, in regard to downlink control signals, transmission processing is performed, including channel coding and inverse fast Fourier transform, and resultant signals are also transferred to the transmission/reception sections 103.

Each transmission/reception section 103 converts the baseband signals, output from the baseband signal processing section 104 after being precoded per each antenna, to a radio frequency band and transmits this radio frequency band. The radio frequency signals that are subject to frequency conversion by the transmission/reception sections 103 are amplified by the amplifying sections 102, and are transmitted from the transmission/reception antennas 101.

Each of the transmission/reception sections (transmission section) 103 is able to transmit information for the user terminal to select OFDM based transmission and/or SC-FDMA based transmission for a UL signal. Note that each transmission/reception section 103 may be configured as a transmitter/receiver, a transmission/reception circuit or a transmission/reception device as explained based on common knowledge in the technical field to which the present invention pertains. The transmission/reception section 103 may be configured of an integral reception section, or may be configured as a transmission section and a reception section.

Whereas, in regard to the uplink signals, radio frequency signals received by each transmission/reception antenna 101 are amplified by each amplifying section 102. The transmission/reception sections 103 receive the uplink signals that are amplified by the amplifying sections 102, respectively. The transmission/reception sections 103 frequency-convert the received signals into baseband signals and the converted signals are then output to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on user data included in the input uplink signals. The signals are then transferred to the higher station apparatus 30 via the transmission path interface 106. The call processing section 105 performs call processing such as setting up and releasing a communication channel, manages the state of the radio base station 10, and manages the radio resources.

The transmission path interface 106 performs transmission and reception of signals with the higher station apparatus 30 via a predetermined interface. Furthermore, the transmission path interface 106 can perform transmission and reception of signals (backhaul signaling) with a neighboring radio base station 10 via an inter-base-station interface (for example, optical fiber or X2 interface compliant with CPRI (Common Public Radio Interface)).

Figure 9:
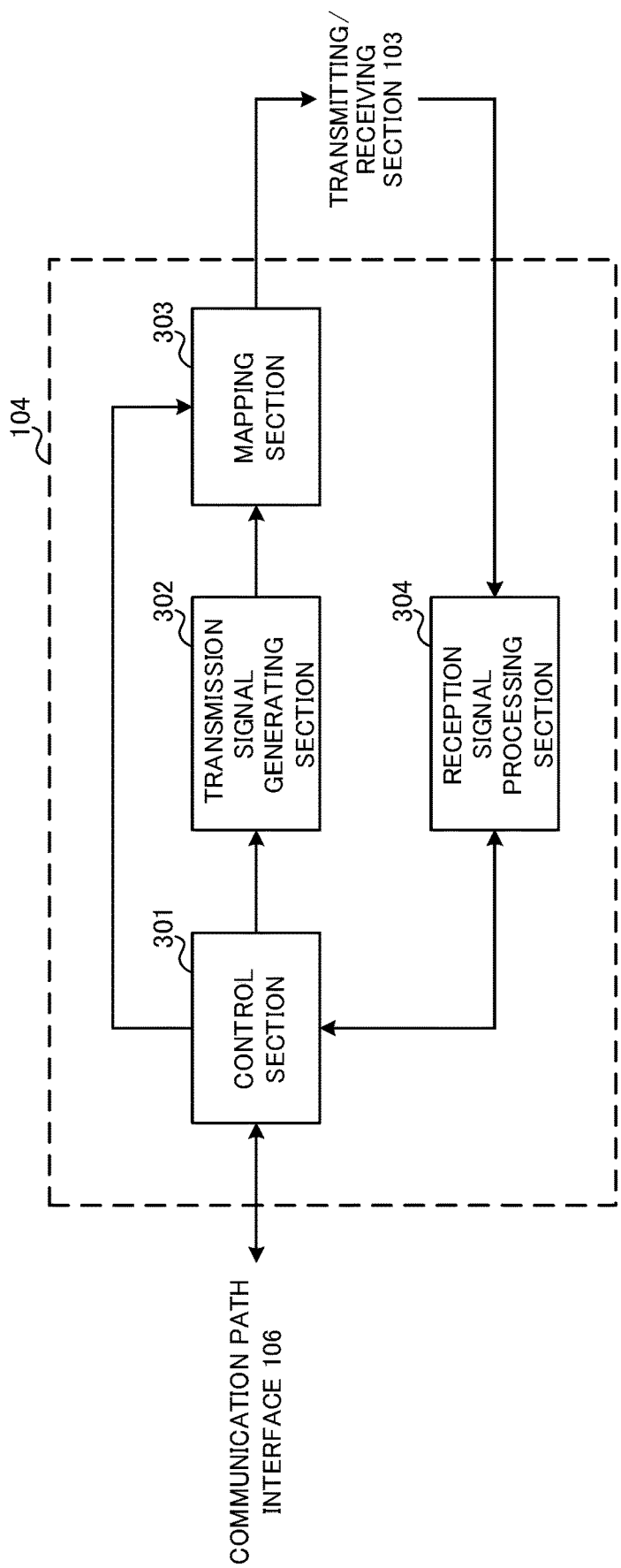
FIG. 9 is a diagram illustrating an example of a functional configuration of the radio base station according to the present embodiment.

FIG. 9 is a diagram illustrating the functional configuration of the radio base station according to the present embodiment. Note that although FIG. 9 mainly shows functional blocks of the features of the present embodiment, the radio base station 10 is also provided with other functional blocks that are necessary for carrying out radio communication. As illustrated in FIG. 9, the baseband signal processing section 104 includes a control section (scheduler) 301, a transmission signal generating section (generating section) 302, a mapping section 303 and a reception signal processing section 304.

The control section (scheduler) 301 controls scheduling (for example, resource allocation) of downlink control signals transmitted on PDCCH and/or EPDCCH and downlink data signals transmitted on PDSCH. In addition, the control section also controls scheduling of the system information, synchronization signals, paging information, CRS (Cell-specific Reference Signal), CSI-RS (Channel State Information Reference Signal and so on. Further, the control section controls scheduling of uplink data signals transmitted on PUSCH, uplink control signals transmitted on PUCCH and/or PUSCH and so on. The control section 301 may be configured of a controller, a control circuit or a control device as explained based on the common knowledge in the technical field to which the present invention pertains.

The transmission signal generating section 302 generates a DL signal (including a downlink data signal and a downlink control signal) based on an instruction from the control section 301, and outputs the generated signal to the mapping section 303. Specifically, the transmission signal generating section 302 generates a downlink data signal (PDSCH) including user data and outputs it to the mapping section 303. In addition, the transmission signal generating section 302 generates a downlink control signal (PDCCH/EPDCCH) including DCI (UL grant, DL assignment) and outputs the signal to the mapping section 303. The transmission signal generating section 302 generates downlink reference signals including CRS, CSI-RS and so on and outputs them to the mapping section 303.

The transmission signal generating section 302 may be configured of a signal generator, a signal generating circuit or a signal generating device as explained based on the common knowledge in the technical field to which the present invention pertains.

Based on an instruction from the control section 301, the mapping section 303 maps the DL signal generated in the transmission signal generating section 302 to predetermined radio resources to output to the transmitting/receiving sections 103. The mapping section 303 can be configured of a mapper, a mapping circuit and a mapping device as explained based on common knowledge in the technical field to which the present invention pertains.

The reception signal processing section 304 performs receiving procession (e.g., demapping, demodulation, and decoding, etc.) on UL signals (HARQ-ACK, PUSCH, etc.) transmitted from the user terminal 20. The result of this processing is output to the control section 301.

The reception signal processing section 304 may be configured of a signal processor, a signal processing circuit, or a signal processing device; or may be configured as a measurer, a measuring circuit or a measuring device as explained based on common knowledge in the technical field to which the present invention pertains.

<User Terminal>

Figure 10:
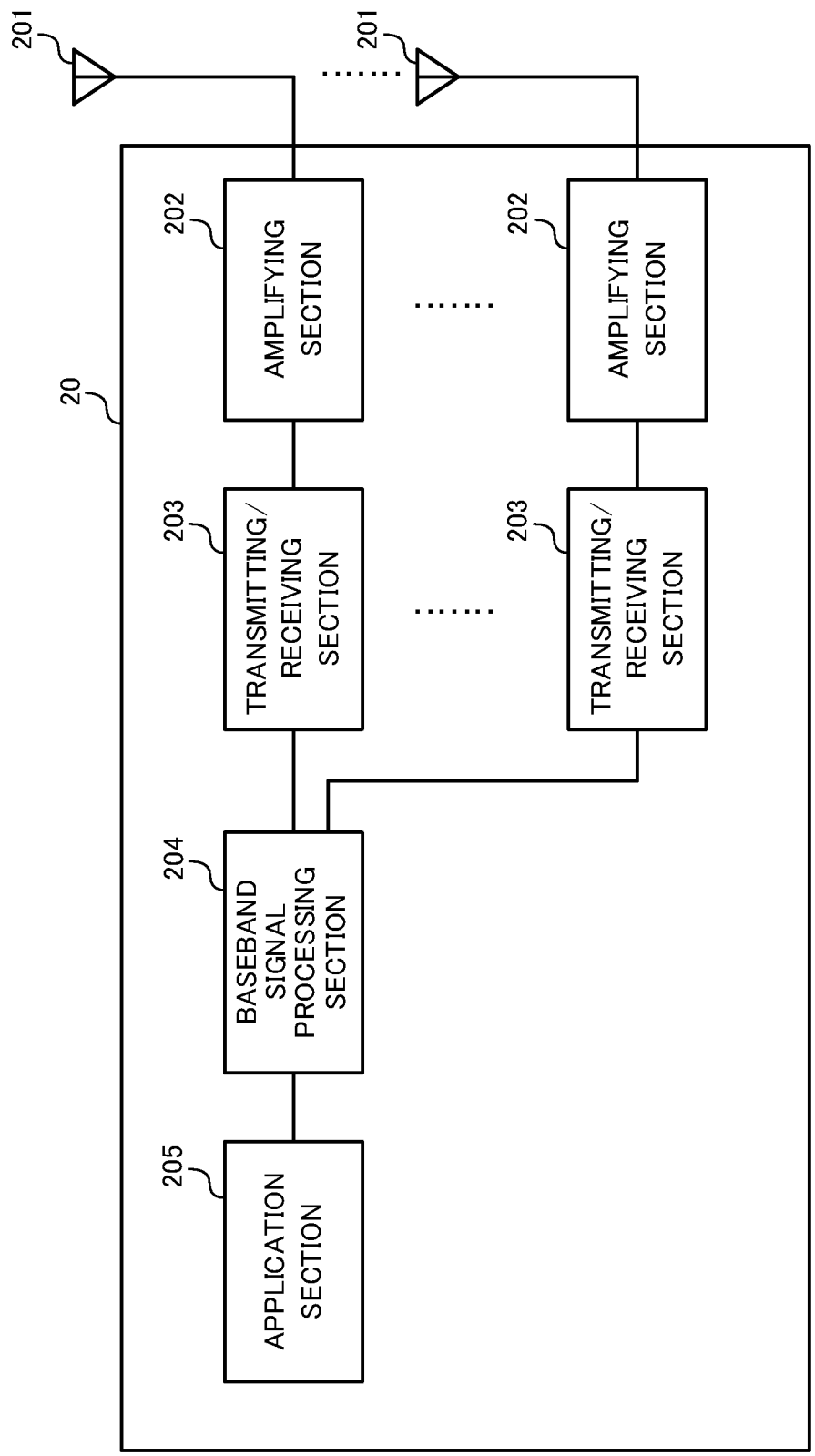
FIG. 10 is a diagram illustrating an example of the overall configuration of a user terminal according to the present embodiment.

FIG. 10 is a diagram showing an overall structure of a user terminal according to an embodiment of the present invention. The user terminal 20 is provided with a plurality of transmission/reception antennas 201 for MIMO communication, amplifying sections 202, transmission/reception sections 203, a baseband signal processing section 204 and an application section 205. Each transmission/reception section 203 may be configured of a transmission section and a reception section.

Radio frequency signals that are received in the plurality of transmission/reception antennas 201 are respectively amplified in the amplifying sections 202. Each transmission/reception section 203 receives a downlink signal that has been amplified by an associated amplifying section 202. The transmission/reception sections 203 perform frequency conversion on the reception signals to convert into baseband signals, which signals are thereafter output to the baseband signal processing section 204.

Each transmission/reception (reception section) 203 receives DL data signals (for example, PDSCH) and DL control signals (for example, PDCCH, etc.). In addition, the transmission/reception section (transmission section) 203 transmits UL control signals ad PUSCH for UL grant/HARQ-ACK. Note that the transmission/reception section 203 may be configured of a transmitter/receiver, a transmission/reception circuit or a transmission/reception device as explained based on the common knowledge in the technical field to which the present invention pertains.

The input baseband signal is subjected to an FFT process, error correction decoding, a retransmission control receiving process, etc., in the baseband signal processing section 204. The downlink user data is forwarded to the application section 205. The application section 205 performs processes related to higher layers above the physical layer and the MAC layer. Furthermore, out of the downlink data, broadcast information is also forwarded to the application section 205.

On the other hand, uplink user data is input to the baseband signal processing section 204 from the application section 205. In the baseband signal processing section 204, a retransmission control transmission process (e.g., a HARQ transmission process), channel coding, precoding, a discrete fourier transform (DFT) process, an inverse fast fourier transform (IFFT) process, etc., are performed, and the result is forwarded to each transmission/reception section 203. The baseband signal that is output from the baseband signal processing section 204 is converted into a radio frequency band in the transmission/reception 203. The radio frequency signal frequency-converted in the transmission/reception section 203 is amplified in the amplifying section 202 and then is transmitted from the transmission and reception antenna 201.

Figure 11:
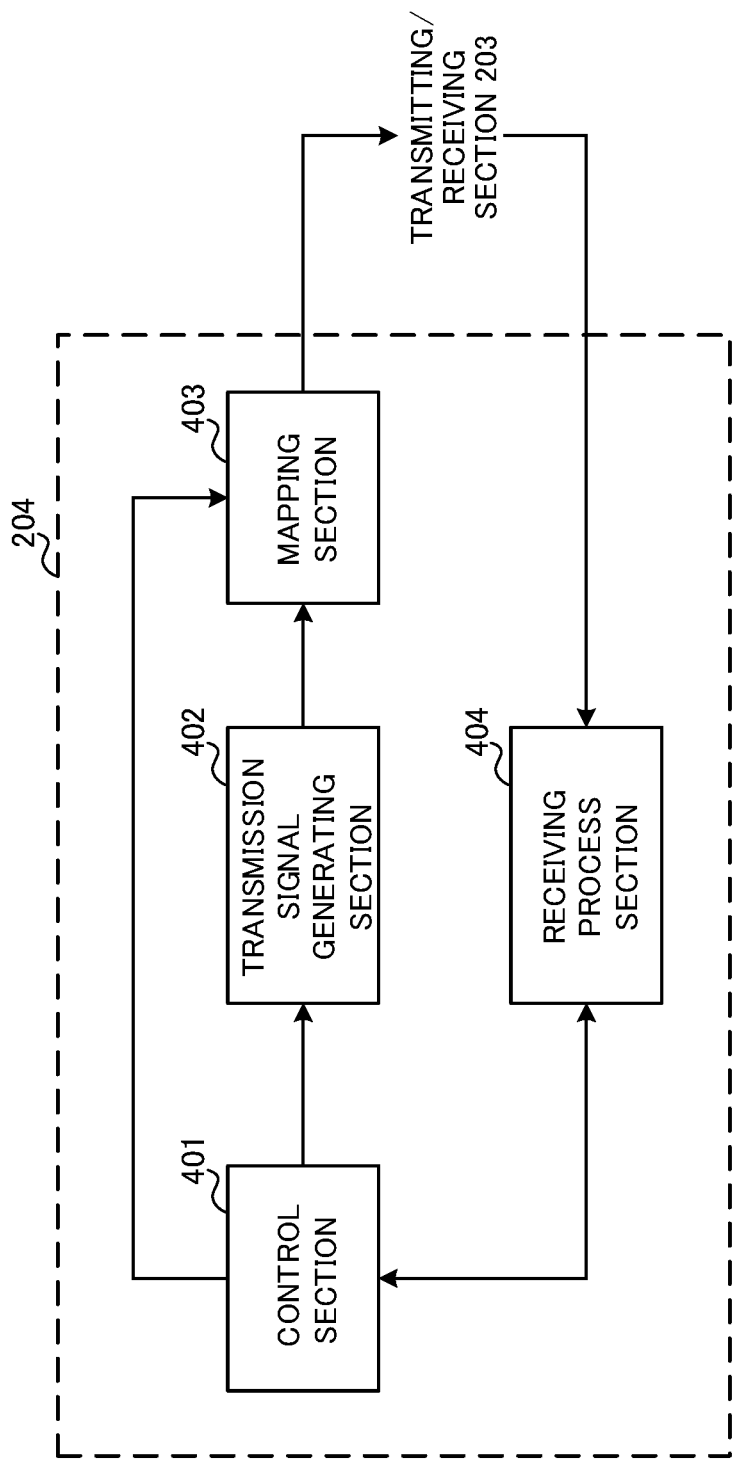
FIG. 11 is a diagram illustrating an example of a functional configuration of the user terminal according to the present embodiment.

FIG. 11 is a diagram illustrating the functional configuration of the user terminal according to the present embodiment. Note that FIG. 11 mainly shows functional blocks of the features of the present embodiment, and the user terminal 20 is also provided with other functional blocks that are necessary for carrying out radio communication. As illustrated in FIG. 11, the baseband signal processing section 204 provided in the user terminal 20 includes a control section 401, a transmission signal generating section 402, a mapping section 403 and a reception signal processing section 404.

The control section 401 obtains, from the reception signal processing section 404, a downlink control signal (signal transmitted on PDCCH/EPDCCH) and a downlink data signal (signal transmitted on PDSCH) transmitted from the radio base station 10. The control section 401 controls generation of an uplink control signal (for example, a transmission acknowledgement signal (HARQ-ACK), etc.) and an uplink data signal based on a result of determination whether retransmission control for the downlink control signal and the downlink data signal is required or not. Specifically, the control section 401 may control the transmission signal generating section 402, the mapping section 403 and the reception signal processing section 404.

The control section 401 is able to apply OFDM based transmission and/or SC-FDMA based transmission to UL signals in accordance with a given condition (switch between OFDM based transmission and SC-FDMA based transmission). For example, the control section 401 is able to control OFDM based transmission and/or SC-FDMA based transmission based on information transmitted from the radio base station. The control section 401 may control to change the location of a reference signal for OFDM based transmission and/or SC-FDMA based transmission.

Further, when performing OFDM based transmission, the control section 401 may control to perform the transmission by frequency-division-multiplexing an uplink control channel and an uplink shared channel in the same subframe. Furthermore, the control section 401 may apply OFDM based transmission to the uplink control channel, apply SC-FDMA based transmission to the uplink control channel, and control to time-division-multiplex the uplink shared channel and the uplink control channel.

Further, when transmitting uplink control information on the uplink shared by applying OFDMA based transmission, the control section 401 may control to perform the transmission by frequency-division-multiplexing the uplink control information and a reference signal. Furthermore, the control section 401 may apply different transmission power control to the OFDMA based transmission and SC-FDMA based transmission. Further, the control section 401 may select either OFDMA based transmission or SC-FDMA based transmission based on at least one of UL transmission power, type of a signal to transmit, and a transmission method. Furthermore, when continuous PRBs are allocated, the control section 401 is able to apply SC-FDMA based transmission to a specific UL signal, irrespective of a given condition.

The control section 401 may be configured of a controller, a control circuit or a control device as explained based on the common knowledge in the technical field to which the present invention pertains.

The transmission signal generating section 402 generates a UL signal based on an instruction from the control section 401, and outputs the UL signal to the mapping section 403. For example, the transmission signal generating section 402 generates an uplink control signal such as a transmission acknowledgement signal (HARQ-ACK) or channel state information (CSI), etc. based on an instruction from the control section 401.

Further, the transmission signal generating section 402 generates an uplink data signal based on an instruction from the control section 401. For example, the transmission signal generating section 402 receives an instruction to generate an uplink data signal from the control section 401, when an UL grant is included in a downlink control signal provided from the radio base station. The transmission signal generating section 402 may be configured of a signal generator, a signal generating circuit or a signal generating device as explained based on the common knowledge in the technical field to which the present invention pertains.

The mapping section 403 maps the UL signal (uplink control signal and/or uplink data) generated by the transmission signal generating section 402, based on an instruction from the control section 401, to a radio resource and outputs the generated signal to the transmission/reception sections 203. The mapping section 403 may be configured of a mapper, a mapping circuit or a mapping device as explained based on the common knowledge in the technical field to which the present invention pertains.

The reception signal processing section 404 performs reception processing (e.g., demapping, demodulation, decoding, etc.) on the DL signal (including a downlink control signal transmitted from the radio base station, a downlink data signal transmitted on PDSCH from the radio base station). The reception signal processing section 404 outputs the information received from the radio base station 10 to the control section 401. The reception signal processing section 404 outputs, for example, broadcast information, system information, RRC signaling, DCI, and so on to the control section 401.

The reception signal processing section 404 may be configured of a signal processor, a signal processing circuit, a signal processing device, a measuring unit, a measuring circuit or a measuring device as explained based on the common knowledge in the technical field to which the present invention pertains. Further, the reception signal processing section 404 may constitute a reception section according to the present invention.

Furthermore, the block diagrams used in the above description of the present embodiments indicate function-based blocks. These functional blocks (configured sections) are implemented via any combination of hardware and software. Furthermore, the implementation of each functional block is not limited to a particular means. In other words, each functional block may be implemented by a single device that is physically connected, or implemented by two or more separate devices connected by a fixed line or wirelessly connected.

For example, some or all of the functions of the radio base station 10 and the user terminal 20 may be implemented by using hardware such as ASICs (Application Specific Integrated Circuits), PLDs (Programmable Logic Devices) and FPGAs (Field Programmable Gate Arrays), etc. Furthermore, the radio base station 10 and the user terminal 20 may be each implemented by a computer device that includes a processor (CPU: Central Processing Unit), a communication interface for connecting to a network, a memory and a computer-readable storage medium that stores a program(s). In other words, the radio base station and the user terminal, etc., pertaining to the embodiment of the present invention may function as a computer that performs processes of the radio communication method pertaining to the present invention.

The processor and memory, etc., are connected to buses for communication of information. Furthermore, the computer-readable storage medium includes, e.g., a flexible disk, a magnetic-optical disk, ROM (Read Only Memory), EPROM (Erasable Programmable ROM), CD-ROM (Compact Disc-ROM), RAM (Random Access Memory), or a hard disk, etc. Furthermore, a program may be transmitted from a network via electric telecommunication lines. Furthermore, the radio base station 10 and the user terminal 20 may also include an input device such as input keys, and an output device such as a display.

The functional configurations of the radio base station 10 and the user terminal 20 may be implemented using the above-mentioned hardware, may be implemented using software modules that are run by a processor, or may be implemented using a combination of both thereof. The processor controls the entire user terminal by operating an operating system. Furthermore, the processor reads programs, software modules and data from the storage medium into a memory, and performs the various processes thereof accordingly.

The above-mentioned program only needs to be a program that can perform the operations described in the above embodiment on a computer. For example, the control section 401 of the user terminal 20 may be stored in the memory, and implemented by the processor operating a control program, and the other above-mentioned functional blocks can also be implemented in the same manner.

Furthermore, software and commands, etc., may be transmitted/received via a transmission medium. For example, in the case where software is transmitted from a website, server or other remote source by using fixed-line technology, such as coaxial cable, optical fiber cable, twisted-pair wire and digital subscriber's line (DSL), etc., and/or wireless technology, such as infrared, radio and microwaves, etc., such fixed-line technology and wireless technology are included within the definition of a transmission medium.

Note that technical terms discussed in the present specification and/or technical terms necessary for understanding the present specification may be replaced with technical terms having the same or similar meaning. For example, channel and/or symbol may be signals (signaling). Furthermore, a signal may be a message. Furthermore, component carrier (CC) may be called a carrier frequency or cell, etc.

Furthermore, information and parameters, etc., discussed in the present specification may be expressed as absolute values, or as a relative value with respect to a predetermined value, or expressed as other corresponding information. For example, a radio resource may be indicated as an index.

Information and signals, etc., discussed in the present specification may be expressed using any one of various different technologies. For example, data, instructions, commands, information, signals, bits, symbols, chips, etc., that could be referred to throughout the above description may be expressed as voltage, current, electromagnetic waves, a magnetic field or magnetic particles, optical field or photons, or a desired combination thereof.

The above-described aspects/embodiments of the present invention may be used independently, used in combination, or may be used by switching therebetween when being implemented. Furthermore, notification of predetermined information (e.g., notification of "is X") does not need to be explicit, but may be implicitly (e.g., by not notifying the predetermined information) carried out.

Notification of information is not limited to the aspects/embodiments of the present invention, such notification may be carried out via a different method. For example, notification of information may be implemented by physical layer signaling (e.g., DCI (Downlink Control Information), UCI (Uplink Control Information)), higher layer signaling (e.g., RRC (Radio Resource Control) signaling, MAC (Medium Access Control) signaling, broadcast information (MIB (Master Information Block), SIB (System Information Block))), by other signals or a combination thereof. Furthermore, RRC signaling may be called a "RRC message" and may be, e.g., an RRC connection setup (RRCConnectionSetup) message, or an RRC connection reconfiguration (RRCConnectionReconfiguration) message, etc.

The above-described aspects/embodiments of the present invention may be applied to a system that utilizes LTE (Long Term Evolution), LTE-A (LTE-Advanced), SUPER 3G, IMT-Advanced, 4G, 5G, FRA (Future Radio Access), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other suitable systems and/or to an enhanced next-generation system that is based on any of these systems.

The order of processes, sequences and flowcharts, etc., in the above-described aspects/embodiments of the present invention can have a switched order so long as no contradictions occur. For example, each method described in the present specification proposes an example of an order of various steps but are not limited to the specified order thereof.

Up to this point, the present invention has been described in detail, however, it would be apparent for a person of ordinary skill in the art that the present invention is not limited to the embodiments described herein. The present invention can be embodied in various modified or altered forms without departing from the sprit or scope of the present invention defined by claims. Accordingly, the description is given only for illustrative purposes and is by no means intended to limit the present invention.

The disclosure of Japanese Patent Application No. 2015-164188, filed on Aug. 21, 2015, including the specification, drawings, and abstract, is incorporated herein by reference in its entirety.

The invention claimed is:

1. A user terminal comprising:
   a transmitter that transmits in an uplink shared channel; and
   a processor that determines whether or not to apply discrete Fourier transform precoding to the uplink shared channel based on a parameter provided by higher layers and downlink control information for scheduling the uplink shared channel,
   wherein the downlink control information is used to schedule the uplink shared channel by using any one of a first resource allocation scheme and a second resource allocation scheme, the first resource allocation scheme being a scheme in which a resource block allocated to the uplink shared channel is indicated by a bitmap, and the second resource allocation scheme being a scheme in which the resource block allocated to the uplink shared channel is indicated by a starting resource block value and a number of resource blocks,
   the first resource allocation scheme is supported for an uplink shared channel to which the discrete Fourier transform precoding is not applied, and the second resource allocation scheme is supported for both of the uplink shared channel to which the discrete Fourier transform precoding is not applied and an uplink shared channel to which the discrete Fourier transform precoding is applied, and the processor determines whether or not to use a CAZAC sequence as a demodulation reference signal depending on whether or not the discrete Fourier transform precoding is applied to the uplink shared channel, wherein if the discrete Fourier transform precoding is applied to the transmitted uplink shared channel, then the processor uses a CAZAC sequence as a demodulation reference signal, and if the discrete Fourier transform precoding is not applied to the transmitted uplink shared channel, then the processor does not use a CAZAC sequence as a demodulation reference signal.

2. The user terminal according to claim 1, wherein the processor time-division-multiplexes uplink control information and the demodulation reference signal and transmits a resultant signal.

3. A radio communication method for a user terminal, comprising:

transmitting in an uplink shared channel; and determining whether or not to apply discrete Fourier transform precoding to the uplink shared channel based on a parameter provided by higher layers and downlink control information for scheduling the uplink shared channel, wherein the downlink control information is used to schedule the uplink shared channel by using any one of a first resource allocation scheme and a second resource allocation scheme, the first resource allocation scheme being a scheme in which a resource block allocated to the uplink shared channel is indicated by a bitmap, and the second resource allocation scheme being a scheme in which the resource block allocated to the uplink shared channel is indicated by a starting resource block value and a number of resource blocks, the first resource allocation scheme is supported for an uplink shared channel to which the discrete Fourier transform precoding is not applied, and the second resource allocation scheme is supported for both of the uplink shared channel to which the discrete Fourier transform precoding is not applied and an uplink shared channel to which the discrete Fourier transform precoding is applied, and determining whether or not to use a CAZAC sequence as a demodulation reference signal depending on whether or not the discrete Fourier transform precoding is applied to the uplink shared channel, wherein if the discrete Fourier transform precoding is applied to the transmitted uplink shared channel, then using a CAZAC sequence as a demodulation reference signal, and if the discrete Fourier transform precoding is not applied to the transmitted uplink shared channel, then not using a CAZAC sequence as a demodulation reference signal.

* * * * *